Nov. 28, 1961  F. A. CLAUSON  3,010,894
ADSORPTIVE SEPARATION PROCESS
Filed June 16, 1958
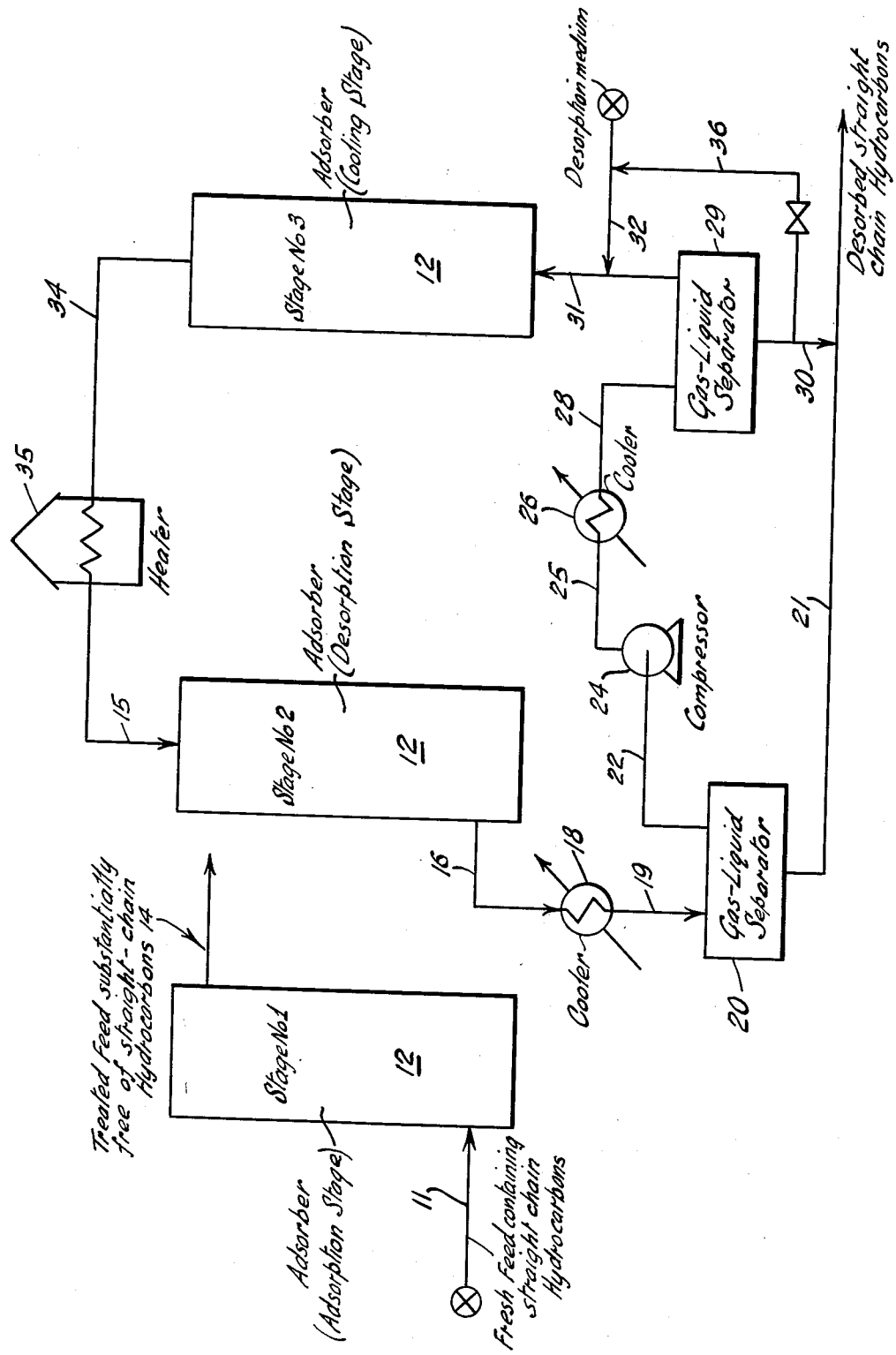

United States Patent Office
3,010,894
Patented Nov. 28, 1961

3,010,894
ADSORPTIVE SEPARATION PROCESS
Frank A. Clauson, Roslyn Heights, N.Y., assignor to Texaco Inc., a corporation of Delaware
Filed June 16, 1958, Ser. No. 742,181
4 Claims. (Cl. 208—310)

This invention relates to a method of fractionating mixtures of organic compounds. More particularly, this invention relates to an adsorptive separation process for the fractionation of hydrocarbon mixtures such as petroleum fractions. Still more particularly, this invention relates to an adsorptive separation process for the fractionation of hydrocarbon mixtures containing straight chain hydrocarbons and non-straight chain hydrocarbons.

A number of processes have been proposed for treating or upgrading petroleum fractions or hydrocarbon mixtures containing straight chain hydrocarbons and non-straight chain hydrocarbons by operations involving selectively adsorbing the straight chain hydrocarbons therefrom by means of an adsorbent. In these proposed processes a selective adsorbent which selectively adsorbs straight chain hydrocarbons to the substantial exclusion of non-straight chain hydrocarbons is employed. These special selective adsorbents are alumino-silicate adsorbents, synthetic or naturally occurring, which exhibit the properties of a molecular sieve. These selective adsorbents comprise matter made up of porous crystals wherein the pores of the crystals are of molecular dimension and are of a uniform size. A particularly suitable solid adsorbent for straight chain organic compounds, such as straight chain hydrocarbons, is a calcium alumino-silicate, apparently actually a sodium calcium alumino-silicate, manufactured by Linde Air Products Company and designated Linde type 5A molecular sieve. The crystals of this particular calcium alumino-silicate have a pore size or opening of about 5 Angstrom units, a pore size sufficiently large to admit straight chain hydrocarbons, such as the normal paraffins, to the substantial exclusion of the non-straight chain hydrocarbons such as the naphthenic, aromatic, isoparaffinic and isoolefinic hydrocarbons. The particular selective adsorbent is available in various sizes such as $\frac{1}{16}''$ or $\frac{1}{8}''$ diameter pellets as well as in the form of finely divided powder.

Other suitable solid selective adsorbents include the synthetic and natural zeolites which, when dehydrated, may be described as crystalline zeolites having a rigid three dimensional anionic network and having interstitial dimensions sufficiently large to permit the entry of and to adsorb straight chain hydrocarbons but sufficiently small to exclude non-straight chain hydrocarbons. The naturally occurring zeolite, chabazite, exhibits such desirable properties. Another suitable naturally occurring zeolite is analcite, $NaAlSi_2O_6 \cdot H_2O$, which, when dehydrated and when all or part of the sodium is replaced by an alkaline earth metal, such as calcium, yields a material which may be represented by the formula $$(Ca, Na_2)Al_2Si_4O_{12} \cdot H_2O$$

and which, after suitable conditioning, will adsorb straight chain hydrocarbons to the substantial exclusion of non-straight chain hydrocarbons. Naturally occurring or synthetically prepared phacolite, gmelinite, harmotome and the like or suitable base exchange modifications thereof are also suitable.

Other molecular sieve type adsorbents which are useful in the fractionation of mixtures containing compounds having different critical molecular dimensions than straight chain hydrocarbons include an alumino-silicate molecular sieve type adsorbent made up of porous crystals wherein the pores of the crystals or openings therein are about 4.0 Angstrom units. This particular molecular sieve 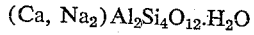 alumino-silicate adsorbent will selectively adsorb those compounds having a critical molecular dimension less than 4.0 Angstrom units, such as ammonia, acetylene, propylene, methane, ethylene and ethane, to the substantial exclusion of those compounds having a critical molecular dimension greater than 4.0 Angstrom units, such as 5.0 Angstrom units, e.g., the $C_4$ and higher hydrocarbons, cyclopropane, propane and the like. Other molecular sieve type alumino-silicate adsorbents having larger pore openings, such as a pore size of 13.0 Angstrom units, are known and are useful for the separation of materials having a critical molecular dimension not greater than 13.0 Angstrom units.

In an adsorptive separation process employing these special selective adsorbents one difficulty has been the relatively large amount of energy which must be expended to effect the desorption of the adsorbed materials therefrom. More specifically, one difficulty has been the relatively large amount of energy required to desorb the adsorbed straight chain hydrocarbons and other compounds from the molecular sieve type alumino-silicate adsorbent containing these materials preferentially adsorbed therein. Further, following the desorption operation which is generally carried out at a relatively high temperature, the selective adsorbent must be cooled by suitable means to the preferred, lower adsorption temperature. Various techniques and methods have been proposed to carry out an adsorptive separation process for the separation of straight chain hydrocarbons from non-straight chain hydrocarbons employing a molecular sieve type alumino-silicate adsorbent which preferentially adsorbs straight chain hydrocarbons.

Accordingly, it is an object of this invention to provide an improved adsorptive separation process.

It is another object of this invention to provide an improved adsorptive separation process for the separation and recovery of straight chain hydrocarbons from hydrocarbon mixtures containing the same in admixture with non-straight chain hydrocarbons.

It is another object of this invention to provide an improved method for upgrading a petroleum fraction containing straight chain hydrocarbons in admixture with non-straight chain hydrocarbons, such as a $C_4$ hydrocarbon fraction containing n-butane and isobutane and various petroleum refinery streams containing straight chain hydrocarbons and non-straight chain hydrocarbons.

It is another object of this invention to provide an improved method for effecting desorption of adsorbed materials, such as straight chain hydrocarbons, from selective adsorbents containing the same.

How these and other objects of this invention are accomplished will become apparent in the light of the accompanying disclosure made with reference to the accompanying drawing which schematically illustrates one embodiment of the practice of this invention directed to the adsorptive separation of straight chain hydrocarbons from a hydrocarbon mixture containing the same, followed by the desorption of the adsorbed straight chain hydrocarbons from the adsorbent in a special manner.

In accordance with this invention an improved adsorptive separation process is obtained by contacting a mixture to be separated with a solid selective adsorbent to effect the selective adsorption or separation of a desired component from the mixture. Following the selective adsorption operation the adsorbent is then treated at an elevated temperature with a hot gaseous desorbing medium to desorb the adsorbed components therefrom. Preferably the flow of gaseous desorption medium in contact with the adsorbent undergoing regeneration is countercurrent with respect to the previous flow therethrough of the mixture undergoing fractionation. Following the desorption operation which is carried out at a suitable elevated temperature the resulting gaseous desorption effluent comprising desorbing medium and the resulting desorbed, previously adsorbed, components or desorbate, is cooled to effect at least partial condensation of the desorbate. The remaining uncondensed desorption effluent, comprising substantially only gaseous desorbing medium is then further cooled or compressed and again cooled to effect substantially complete removal of the desorbate therefrom. The resulting cooled or compressed and cooled desorbing medium is then employed to cool the selective adsorbent. During the cooling operation the compressed and cooled desorbing medium is passed in heat exchange relationship with the selective adsorbent preferably in a flow direction countercurrent with respect to the flow of hot gaseous desorbing medium therethrough during the desorption or regeneration operation. Accordingly, the practice of this invention involves three operations or stages: stage 1, adsorption, wherein the component to be selectively adsorbed is removed from the mixture containing the same; stage 2, desorption, wherein the adsorbent is heated to effect desorption of the adsorbed component therefrom; stage 3, cooling, wherein the adsorbent, after having been subjected to the high temperature desorption operation (stage 2) is cooled by passing therethrough in heat exchange relationship relatively cool desorption medium.

In accordance with one specific embodiment of the practice of this invention directed to the adsorptive separation of straight chain hydrocarbons from a hydrocarbon mixture containing straight chain hydrocarbons together with non-straight chain hydrocarbons such as naphthenic, aromatic and isoparaffinic hydrocarbons, the hydrocarbon mixture during the adsorption operation is passed in direct contact with a selective adsorbent, such as an alumino-silicate molecular sieve type adsorbent, e.g., Linde type 5A molecular sieve. Desirably the contacting is carried out under conditions such that the hydrocarbon mixture undergoing fractionation by selective adsorption is maintained in the liquid phase. Following the liquid phase adsorption operation the selective adsorbent, now substantially saturated with straight chain hydrocarbons, is subjected to countercurrent contact with a hot gaseous desorbing medium. The desorption operation is desirably carried out at a temperature and pressure such that not only is the gaseous desorbing medium maintained in the gaseous phase during the desorption operation but the resulting desorbed straight chain hydrocarbons are recovered during the desorption operation in the gaseous or vaporized phase.

As a result of the desorption operation there is recovered a relatively hot gaseous desorption effluent comprising the desorbed straight chain hydrocarbons in gaseous admixture with the gaseous desorbing medium. The desorption effluent is then cooled to condense all or at least a portion of the straight chain hydrocarbons therefrom. The remaining, uncondensed gaseous desorption effluent, comprising substantially only or mainly gaseous desorbing medium together with any residual uncondensed straight chain hydrocarbons, is compressed and again cooled to a suitable temperature to effect substantially complete condensation of all of the straight chain hydrocarbons therefrom. The remaining compressed and cooled gaseous desorbing effluent (medium) is then employed to cool the selective adsorbent, stage 2 operation, by passing the compressed and cooled gaseous desorbing medium in heat exchange relationship therewith.

The adsorbent may be cooled by direct contact with the compressed cooled desorption medium or the adsorbent may be cooled by indirect heat exchange relationship therewith. When the adsorbent has been cooled to a suitable low temperature it is then contacted with additional liquid mixture to be fractionated in accordance with the practice of this invention for the removal of straight chain hydrocarbons therefrom.

As indicated hereinabove, it is preferred in the practice of this invention to carry out the initial or stage 1 operation under conditions such that the mixture undergoing fractionation by adsorptive separation is maintained therein in the liquid phase. Desirably the adsorption operation is carried out at an ambient temperature, such as any suitable temperature in the range 40–400° F., more or less, depending upon the boiling point of the components comprising the mixture undergoing fractionation and/or the pressure applied during the adsorptive separation operation. As indicated, it is desirable that the adsorption operation be carried out at a pressure such that during the adsorption operation the mixture undergoing fractionation is maintained in the liquid phase.

Following the liquid phase adsorption operation the adsorbent, now saturated with straight chain hydrocarbons, is countercurrently contacted with a gaseous desorbing medium. Desirably the desorption operation is carried out at a temperature higher than the adsorption temperature, such as a temperature at least 100 degrees Fahrenheit higher than the adsorption operation. The desorption operation is suitably carried out at a temperature in the range 200–800° F., more or less, depending upon the molecular weight of the straight chain hydrocarbons to be adsorbed and/or the particular gaseous desorbing medium employed. Desirably the desorption operation is carried out at a suitable pressure such that during the desorption operation the gaseous desorbing medium and the resulting desorbed straight chain hydrocarbons are contained in the gaseous phase. The desorption operation may be substantially isobaric with respect to the adsorption operation or may be carried out at a pressure less than or greater than the adsorption operation. A desorption pressure in the range 2–400 p.s.i.a. is convenient and suitable, especially so when the liquid phase adsorption operation is carried out at substantially atmospheric pressure.

Following the high temperature desorption operation the adsorbent is cooled by passing therethrough in heat exchange relationship cooled desorption effluent, preferably comprising substantially only the gaseous desorbing medium. During the stage 3 operation in accordance with the practice of this invention wherein the adsorbent is cooled to a temperature suitable for carrying out the liquid phase adsorption operation the gaseous cooling medium, obtained by cooling the desorption effluent from the stage 2 operation (desorption) to a suitable low temperature, e.g., in the range 55–300° F., is passed therethrough in a direction countercurrent to the previous flow of hot gaseous desorbing medium therethrough.

In the practice of this invention various materials may be employed to supply the gaseous desorbing medium. The following materials are suitable for use in the practice of this invention as the desorbing medium, hydrogen, carbon dioxide, methane, flue gas, normally gaseous hydrocarbons such as ethane, propane, n-butane, isobutane, nitrogen, and the like. In general, in the practice of this invention it is desirable to employ as the desorbing medium a material which is readily separable by distillation, liquefaction and the like from the resulting desorbate.

Referring now to the accompanying drawing which schematically illustrates one embodiment of the practice of this invention a liquid fresh feed such as a petroleum naphtha, e.g., a straight run petroleum naphtha containing straight chain hydrocarbons and non-straight chain hydrocarbons, is supplied from a suitable source, not shown, via line 11 into adsorber 12 wherein it contacts an aluminosilicate molecular sieve type adsorbent which selectively adsorbs straight chain hydrocarbons to the substantial exclusion of non-straight chain hydrocarbons. The mass of adsorbent within adsorber 12 is subjected to direct contact at a suitable ambient temperature, about 100° F., with the liquid petroleum feed introduced thereinto. As a result of the aforesaid contacting operation there is recovered from adsorber 12 via line 14 a resulting treated effluent substantially free of straight chain hydrocarbons.

Following the above-described liquid phase adsorptive separation operation the adsorbent, now substantially saturated with straight chain hydrocarbons, is subjected to stage 2 operation in accordance with this invention. During stage 2 operation the adsorbent is desorbed of the adsorbed straight chain hydrocarbons. The desorption of the adsorbed straight chain hydrocarbons is effected by flowing in counter-current direct contact with the adsorbent within adsorber 12 a hot gaseous desorbing medium such as hot gaseous hydrogen at about or slightly above (2–50 p.s.i.) atmospheric pressure introduced into the upper end of adsorber 12 via line 15. The temperature of the gaseous desorbing medium is in the range 300–1000° F., such as 900° F., a temperature substantially greater than the adsorption temperature. The hot gaseous desorbing medium, hydrogen, as it flows in direct contact with the adsorbent within adsorber 12 desorbs and strips the previously adsorbed straight chain hydrocarbons therefrom.

As a result of the desorption operation there is recovered from the lower end of adsorber 12 via line 16 a gaseous desorption effluent comprising hydrogen and the desorbed straight chain hydrocarbons. The gaseous desorption effluent is then cooled to a suitable temperature, such as about 100° F., by passage through cooler 18. The resulting cooled desorption effluent, comprising gaseous hydrogen and condensed straight chain hydrocarbons is removed from cooler 18 via line 19 and passed to gas-liquid separator 20 wherein the condensed straight chain hydrocarbons are removed via line 21. The remaining gaseous uncondensed desorption effluent is removed from gas-liquid separator 20 via line 22 and passed to compressor 24, such as a turbocompressor, wherein it is compressed. The resulting compressed desorption effluent, now at an increased pressure, about 5–50 p.s.i. greater, issues from compressor 24 via line 25 and is passed through cooler 26 wherein substantially all of the straight chain hydrocarbons are condensed therefrom. The resulting compressed cooled effluent is removed from cooler 26 via line 28 to gas-liquid separator 29 wherein the residual, condensed straight chain hydrocarbons are removed via line 30. The remaining compressed cooled gaseous desorption effluent, now at a temperature of about 100° F. and at a pressure in the range 5–100 p.s.i.g. greater than the pressure of the gaseous effluent in line 22, such as a pressure of about 30 p.s.i.g., is passed from gas-liquid separator 29 via line 31 into adsorber 12. As required additional desorption medium may be supplied from a suitable source via line 32.

The compressed cooled gaseous desorbing medium in line 31 is introduced into adsorber 12 into heat exchange relationship with the hot selective adsorbent within adsorber 12. Adsorber 12 may be provided with heat exchange tubes, not illustrated, through which or around which the cooled gaseous effluent passes in indirect heat exchange relationship with the adsorbent in adsorber 12 and in countercurrent flow relationship with respect to the hot gaseous desorbing medium previously introduced into adsorber 12 via line 15. As the cooled compressed desorption medium flows through adsorber 12 in heat exchange relationship with the adsorbent material therein, the adsorbent is cooled from a temperature of about 800° F. to a temperature of about 100° F. The resulting hot gaseous desorption effluent is recovered from adsorber 12 via line 34 and passed through heater 35 wherein its temperature is increased to a suitable desorption temperature, indicated hereinabove. The resulting heated gaseous desorbing medium, as it issues from heater 35 at a temperature of about 900° F. is then introduced into the upper portion of adsorber 12 via line 15.

For reasons of clarity and ease of understanding the practice of this invention has been illustrated with respect to the operation of a single adsorber. It is well within the skill of those in the art in the light of this disclosure to provide a multiple arrangement of adsorbers simultaneously undergoing adsorption, desorption and cooling, together with accompanying transfer piping and accessory processing and control equipment in order that this invention may be carried out on a substantially continuous basis.

Referring now to another embodiment of the practice of this invention wherein a $C_4$ fraction such as a $C_4$ fraction containing substantially only n-butane and/or isobutane is employed as the desorption medium, a liquid hydrocarbon fraction such as a petroleum naphtha containing 2–60% by weight straight chain hydrocarbons is introduced into adsorber 12 via line 15. There is recovered overhead from adsorber 12 via line 14 a treated naphtha now substantially free of straight chain hydrocarbons. Following the removal of straight chain hydrocarbons from the naphtha the adsorbent in adsorber 12 is contacted with a hot $C_4$ hydrocarbon such as hot gaseous n-butane introduced into the upper portion of adsorber 12 via line 15. The resulting desorbed straight chain hydrocarbons together with the n-butane, both in the gaseous phase, are recovered from the lower end of adsorber 12 via line 16. The desorption effluent is then cooled in cooler 18 and the resulting cooled effluent, containing gaseous $C_4$ hydrocarbon and condensed straight chain hydrocarbons and partially condensed $C_4$ hydrocarbon, is passed from cooler 18 via line 19 into gas-liquid separator 20 from which the condensed, liquefied straight chain hydrocarbons are recovered via line 21. The residual desorption effluent comprising substantially only $C_4$ hydrocarbons, n-butane, is recovered from gas-liquid separator 20 via line 22, compressed in compressor 24 and passed via line 25 through cooler 26 and line 28 into gas-liquid separator 29. If any substantial amount of straight chain hydrocarbon is present in the resulting compressed, liquefied $C_4$ hydrocarbon desorption medium these straight chain hydrocarbons are separated by fractionation, by means not shown. Otherwise the resulting condensed $C_4$ hydrocarbon, n-butane, is recovered from gas-liquid separator 29 via lines 30, 36, 32 and 31 and introduced into the lower portion of adsorber 12. Within adsorber 12 the condensed, liquefied $C_4$ hydrocarbon, n-butane, directly contacts the selective adsorbent therein to cool the same. In this manner the selective adsorbent within adsorber 12 is cooled by direct contact with liquefied $C_4$ hydrocarbon, the desorbing medium. As a result of these operations there issues from the upper portion of adsorber 12 via line 34 a gas-liquid admixture of desorbing medium, n-butane, which is heated in heater 35 and introduced via line 15 into adsorber 12, undergoing stage 2 operation, to desorb the adsorbed straight chain hydrocarbons therefrom.

By employing a liquid $C_4$ hydrocarbon such as n-butane during the stage 2 and 3 operations, of a process in accordance with this invention the resulting cooled selective adsorbent will be substantially saturated with n-butane prior to contact with the petroleum naphtha fraction undergoing fractionation. This adsorbed n-butane, however, is readily displaced from the selective adsorbent by the higher molecular weight straight chain hydrocarbons contained in the petroleum naphtha undergoing treatment. Another advantage of carrying out the practice of this invention by employing a liquefied $C_4$ as the cooling agent derives from the fact that the heat of adsorption of the n-butane in the adsorbent undergoing cooling (stage 3 operation) is transferred eventually to the stage 2 operation for the desorption of the adsorbed straight chain hydrocarbons from the adsorbent.

Although in the accompanying disclosure considerable emphasis has been placed on the separation of straight chain hydrocarbons from non-straight chain hydrocarbons, in general the practice of this invention is applicable to the separation of one compound or element from another compound or element employing a selective adsorbent. Also, the practice of this invention is generally applicable to selective adsorbents other than molecular sieve type selective adsorbents. More particularly, the practice of this invention is applicable to such selective adsorbents as silica gel, alumina, charcoal, and the like.

Further, any petroleum refinery stream or mixture of materials containing a compound which is capable of being selectively adsorbed with respect to the other compounds associated therewith may be satisfactorily treated in accordance with this invention. In addition to petroleum refinery streams, such as petroleum naphtha, other petroleum fractions, such as kerosene, diesel oil, light lube oil, gaseous admixtures of normally gaseous hydrocarbons, $C_4$ hydrocarbon streams and the like, are also suitably employed in the practice of this invention. For example, the practice of this invention is particularly applicable for the fractionation of a $C_4$ hydrocarbon stream containing n-butane and isobutane for the preparation of a feed stock to an alkylation unit, such as the preparation of a substantially pure stream of isobutane. It is mentioned that when a relatively low boiling hydrocarbon is subjected to selective adsorption in accordance with the practice of this invention it is preferred to employ as the desorbing medium a relatively high boiling, higher molecular weight material or hydrocarbon which is readily separable by fractional distillation from the components of the mixture undergoing fractionation. More particularly, when a $C_4$ hydrocarbon stream containing n-butane and isobutane is fractionated in accordance with this invention a higher boiling or a higher molecular weight hydrocarbon such as isopentane, isohexane, or similar higher boiling or higher molecular weight hydrocarbon, preferably a hydrocarbon which is not adsorbed by the selective adsorbent, is employed as the desorbing fluid.

As will be apparent to those skilled in the art many modifications, substitutions and alterations may be made in the light of the accompanying disclosure without departing from the spirit or scope of this invention.

I claim:
1. A process for separation of straight chain hydrocarbons from mixtures thereof with non-straight chain hydrocarbons with an alumino-silicate molecular sieve adsorbent which selectively adsorbs straight chain hydrocarbons to the substantial exclusion of non-straight chain hydrocarbons comprising introducing a liquid feed mixture of said hydrocarbons into one end of a zone containing a mass of said molecular sieve adsorbent which is at least partially saturated with adsorbed liquid $C_4$ hydrocarbons; withdrawing resulting effluent having a substantially reduced straight chain hydrocarbon content from the other end of said zone; discontinuing introduction of said mixture to said zone; thereafter introducing via said other end of said zone a gaseous desorption medium comprising a $C_4$ hydrocarbon fraction into contact with said adsorbent at an elevated temperature sufficient to desorb adsorbed straight chain hydrocarbons therefrom; withdrawing from said one end of said zone resulting gaseous desorption effluent comprising desorbed straight chain hydrocarbons together with said desorption medium, discontinuing the flow of gaseous desorption medium to said zone when desorption is substantially complete; thereafter cooling said gaseous desorption effluent effecting condensation of a portion of the desorbed straight chain hydrocarbons present therein and separating resulting condensate from uncondensed gaseous residual desorption effluent; compressing and further cooling said residual desorption effluent effecting liquefaction of at least a portion of the $C_4$ hydrocarbons present therein; introducing into said one end of said zone said further cooled residual effluent comprising liquid $C_4$ hydrocarbons into contact with heated desorbed adsorbent effecting vaporization of a portion of said liquid $C_4$ hydrocarbons with concomitant cooling of said adsorbent and saturation of at least a portion of said cooled adsorbent with liquid $C_4$ hydrocarbons; withdrawing from said other end of said zone resulting heated residual effluent of reduced $C_4$ hydrocarbon content; and containing vaporized $C_4$ hydrocarbons; further heating said resulting residual effluent and supplying same as said gaseous desorption medium for said desorption step; thereafter reintroducing said liquid feed mixture of hydrocarbons into said inlet end of said vessel into contact with cooled adsorbent containing said liquid $C_4$ hydrocarbons.

2. A method in accordance with claim 1 wherein said desorption medium is isobutane.

3. A method in accordance with claim 1 wherein said desorption medium is n-butane.

4. A method in accordance with claim 1 wherein said desorption medium is a $C_4$ hydrocarbon fraction and wherein said desorption effluent is compressed and cooled to condense substantially all of the $C_4$ hydrocarbons therein and wherein the resulting condensed $C_4$ hydrocarbon is employed to cool said selective adsorbent by direct contact therewith.

References Cited in the file of this patent

UNITED STATES PATENTS

| | | |
|---|---|---|
| 2,643,972 | Weedman | June 30, 1953 |
| 2,818,449 | Christensen et al. | Dec. 31, 1957 |
| 2,818,455 | Ballard et al. | Dec. 31, 1957 |
| 2,850,549 | Ray | Sept. 2, 1958 |
| 2,866,835 | Kimberlin et al. | Dec. 30, 1958 |
| 2,899,379 | Wilchinsky et al. | Aug. 11, 1959 |
| 2,920,038 | Feldbauer et al. | Jan. 5, 1960 |